Feb. 27, 1962 W. C. DILLON ET AL 3,023,276

COMMUNICATION SYSTEM

Filed Aug. 23, 1957 2 Sheets-Sheet 1

Inventors
William C. Dillon
Clarence H. Kehm
By Schroeder, Hofgren, Brady & Wegner
Attorneys Inventors
William C. Dillon
Clarence H. Kehm
By Schroeder, Hofgren, Brady & Wegner
Attorneys United States Patent Office 3,023,276

Patented Feb. 27, 1962

3,023,276

COMMUNICATION SYSTEM

William C. Dillon, Van Nuys, Calif., and Clarence H. Kehm, Chicago, Ill., assignors to W. C. Dillon & Company, Inc., a corporation of Illinois Filed Aug. 23, 1957, Ser. No. 679,840
3 Claims. (Cl. 179—15)

This invention is concerned with a telephone system and more particularly with a telephone system utilizing modulated carrier waves transmitted over a suitable transmission line.

Prior carrier wave telephone systems, as exemplified in Dillon and Kehm Patents 2,535,906 and 2,604,544 and in copending Dillon and Kehm application, Serial No. 409,888, filed February 12, 1954, now abandoned, have provided a separate carrier frequency for each subscriber unit. It has been found that the center frequencies of adjacent carrier channels must be separated by at least 7,150 cycles and should be harmonically related in order to prevent objectionable interference between channels. As the carrier frequency is increased the losses incurred on a cable or open wire line also increase so that carrier systems are limited in the number of subscribers that may be handled by the nature of the line and the amount of carrier power available at the central station.

It is a principal object of this invention to provide a novel system which permits maximum economical utilization of the transmission line and central station equipment of a carrier telephone system.

One feature of the invention is the provision of a carrier telephone system including a source of carrier signal, a transmission line and a plurality of subscriber units connected to the transmission line, each including circuitry responsive to the frequency of the carrier signal. Another feature is the provision in such a system of frequency sensitive indicating means at each of said subscriber units and a plurality of ringing signal generators each operating at a different frequency, together with means for independently connecting the ringing signal generators to modulate the carrier signal and actuate the indicating means at a selected subscriber unit.

A further feature is that the telephone system includes a plurality of sources of carrier signal and a plurality of subscriber units, at least two units being responsive to each of the carrier signals.

Another feature is that the central station includes a source of carrier signal and a source of direct current, and subscriber units connected to the transmission line include units responsive to the carrier signal and other units responsive to direct current. Still a further feature is that the subscriber units responsive to the carrier signal include band pass filters while the subscriber units responsive to the direct current include low pass filters.

Further features and advantages will readily be apparent from the following specification and from the drawings in which.

Carrier telephone systems are used principally in rural areas where a single transmission line may extend for many miles over a large area to serve a relatively small number of subscribers. It is economically impractical to install a separate transmission line system for each small group of subscribers or to install amplifiers at various points along the line as was necessary with prior systems.

The present invention obviates this difficulty by providing a system in which several carrier subscriber units operate on each carrier frequency and with which subscriber units operating on direct current may be connected to the transmission line along with the carrier units.

Figure 1:
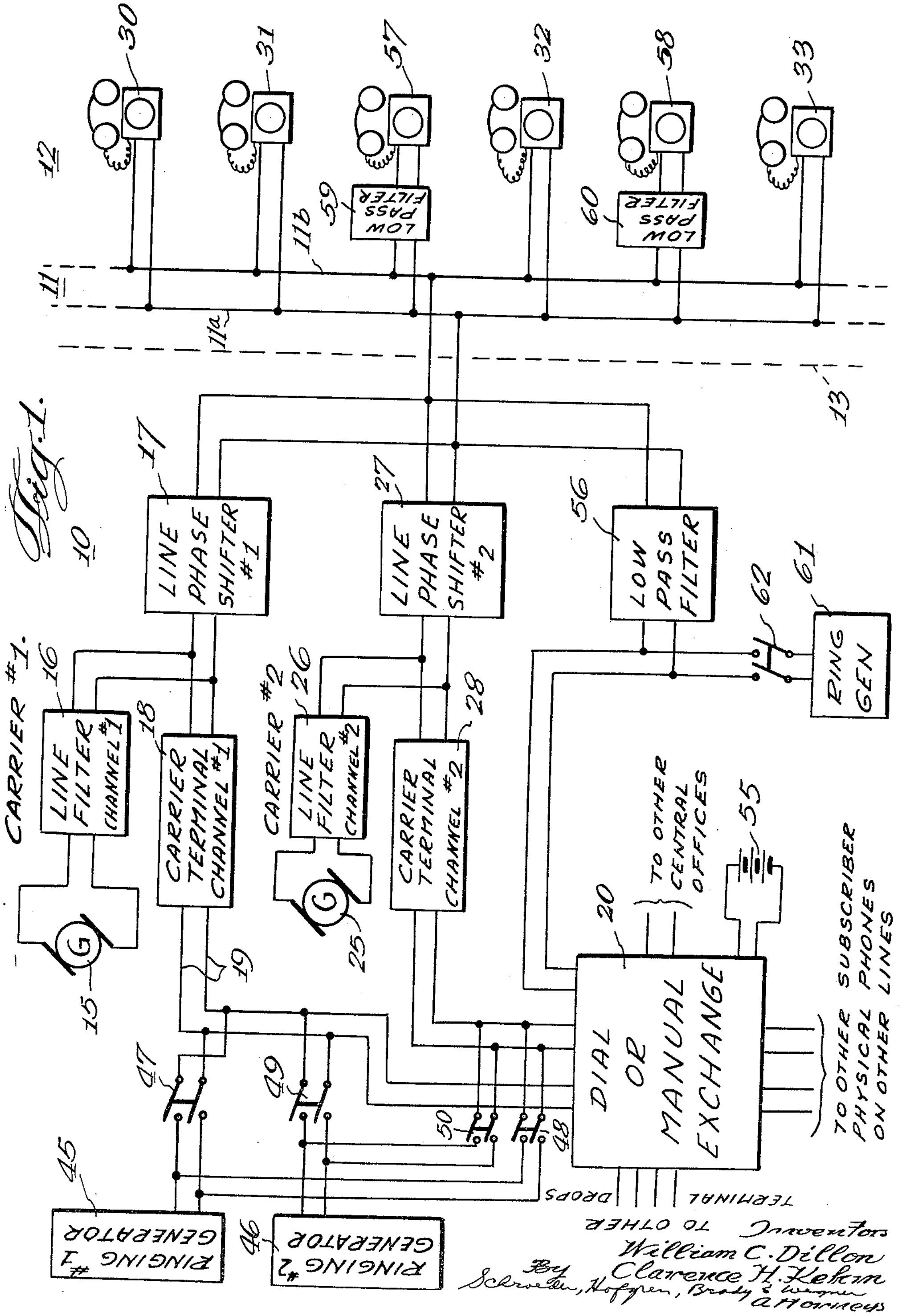
FIGURE 1 is a block diagram of a system embodying the invention.

Turning now to the drawings, in FIGURE 1 a system embodying the invention is illustrated in block form. Many of the details of the circuitry are not shown in detail herein and reference may be had to the aforementioned patents and pending application where specific circuits are disclosed. The telephone system includes three basic elements: a central station 10, a transmission line 11, here shown as two wires **11*a* and 11*b*, and a plurality of subscriber units 12. All of the elements shown in FIGURE 1 and lying to the left of broken line 13 are preferably located at and form a part of the central station 10. Certain equipment is necessary for each carrier channel operating in the system. For carrier channel No. 1, a generator 15 produces a carrier wave of the desired frequency and suitable power for the transmission line 11. The generator 15 is connected through a line filter 16, which is esssentially a narrow band pass filter, and line phase shifter 17 to the transmission line 11. Carrier generator 15 is also coupled, through line filter 16, with a carrier terminal unit 18. The terminal unit 18 includes a wide band pass filter which will pass the carrier frequency together with suitable side bands for handling the desired audio information, a phase shift network and a modulator-demodulator network in which outgoing messages modulate the carrier while incoming messages are demodulated. The audio information from carrier terminal unit 18 is coupled through wires 19 to the telephone exchange 20 which, of course, may be either dial or manual. Connections may be made from the exchange 20** to other carrier channels on the same line or other lines, to direct current telephones or to other central offices, as indicated.

Apparatus comparable to that provided for the first carrier channel is provided for other carrier channels. As shown in the drawing, the equipment for channel No. 2 includes generator 25, line filter 26, line phase shifter 27 and carrier terminal unit 28. While only two carrier channels are illustrated, it will be understood that in practice a large number of carriers may be used on a single line, limited only by the nature of the line and the amount of power available.

Figures 2, 3:
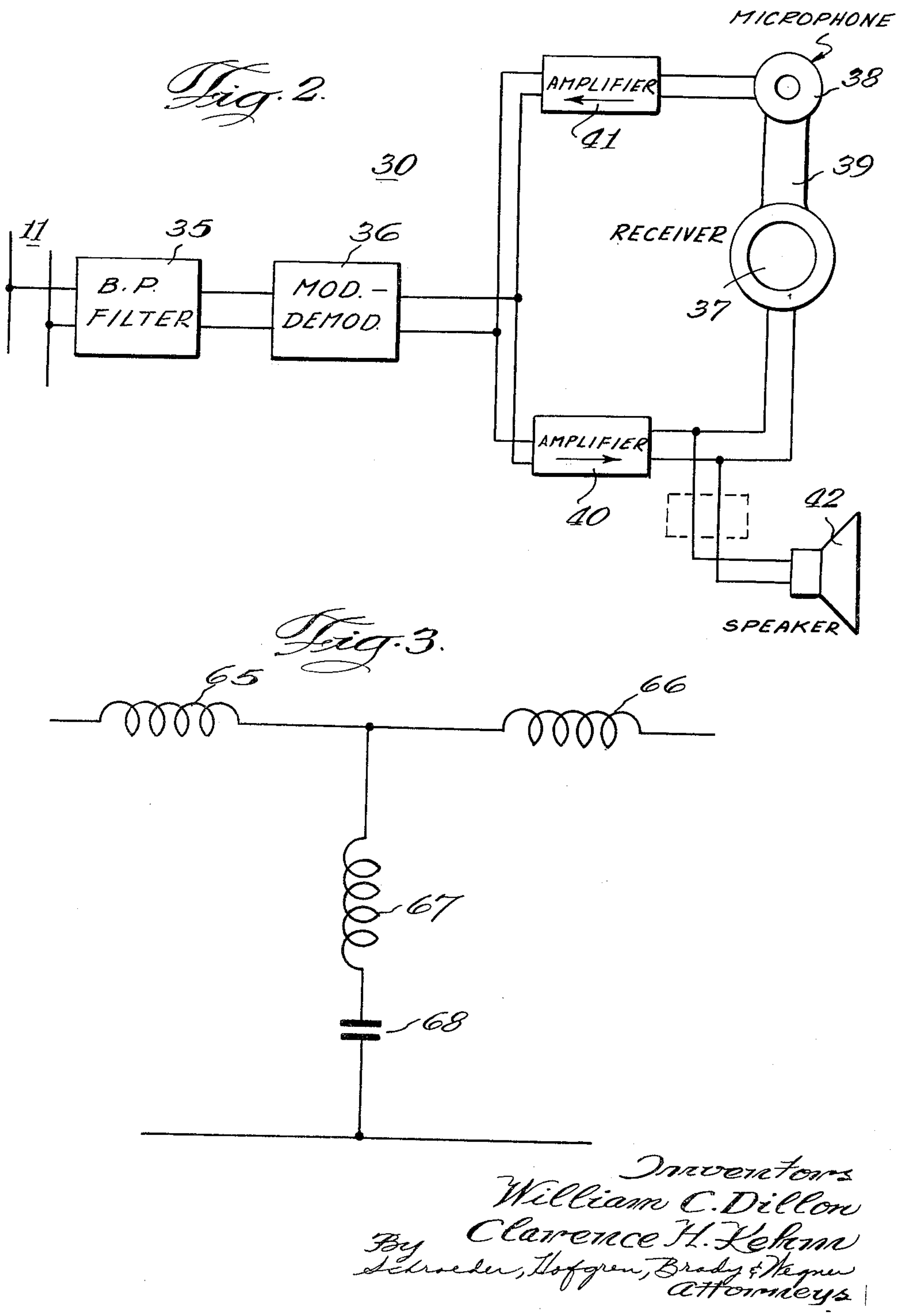
FIGURE 2 is a block diagram of the carrier subscriber unit.
FIGURE 3 is a schematic drawing of a low pass filter.

Connected to the transmission line 11 are a plurality of carrier subscriber units 30, 31, 32 and 33. The subscriber units are essentially identical, except for the frequencies to which they respond, and the basic components are illustrated in FIGURE 2. The carrier subscriber unit is connected to the transmission line 11 through a band pass filter 35 and a modulator-demodulator unit 36. A receiver 37 and microphone 38 may be combined in a suitable hand set 39.

Incoming modulated signals are coupled through band pass filter 35 to modulator-demodulator 36 in which the audio information is removed from the carrier. The audio signal is amplified by amplifier 40 and coupled to receiver 37. When the person at the subscriber unit speaks, the audio is picked up by the microphone, amplified by amplifier 41 and coupled to modulator-demodulator 36 where it modulates the carrier wave. A frequency sensitive speaker 42 is connected to the output of amplifier 40 and, as will appear, responds to a suitable ringing signal provided at the central station to indicate an incoming call for the subscriber station.

Returning to a consideration of FIGURE 1, two carrier generators 15 and 25 are shown connected to transmission line 11. It will be assumed that of the four carrier subscriber units 30, 31, 32 and 33, two are tuned to the frequency of carrier No. 1, while the other two are tuned to the frequency of carrier No. 2. To permit signalling of the subscriber units when they are being called, a frequency sensitive indicating means is provided at each unit. In the preferred form of the invention illustrated, the indicating means is a frequency sensitive loud speaker 42, FIGURE 2. The frequency sensitive loud speaker is preferably mechanically resonant at an audio frequency and is sufficiently selective that it has very little output at frequencies other than the resonant frequency. The loud speaker at each of the subscriber units operating on the same carrier frequency channel is designed to respond to a different audio frequency. For example the speaker at one unit may be designed to respond to an audio signal of 400 cycles, that at a second unit to a frequency of 600 cycles, and that at a third to a frequency of 1000 cycles. The only requirement is that the frequencies be sufficiently separated so that only the desired loud speaker is actuated.

In order to actuate the indicating loud speaker 42, and its counterpart at the other subscriber units, special ringing generators are provided at the central station. In FIGURE 1, two ringing generators 45 and 46 are shown. With the subscriber units described above, the ringing generator 45 has a frequency of 400 cycles per second while the ringing generator 46 has a frequency of 600 cycles per second. Switches 47 and 48, associated with ringing generator 45 and switches 49 and 50, associated with ringing generator 46, are provided for selectively connecting the ringing generators to moduate the carrier signals. Thus, if a call is received for the subscriber unit on channel No. 1 and having local indicating means responsive to the ringing frequency of ringing generator 45, switch 47 is closed, either manually by an operator or automatically in response to the selection of dial equipment, and the carrier generated by generator 15 is modulated in the modulator portion of the carrier terminal unit 18. The modulated signal is in turn received by the subscriber unit 30, demodulated and the ringing signal coupled to the indicating device or loud speaker 42. Similarly, switch 48 would be closed to call the subscriber unit operating on the second carrier channel having an indicating device sensitive to the frequency of ringing generator 45. The ringing signal may, of course, be either a continuous note or may be pulsed to provide a series of short signals.

In accordance with the present invention, provision is made for operating direct current or D.C. telephones on the same line with the carrier phones. Normally the D.C. subscriber units will be those closest to the central station 10. The use of both carrier and D.C. subscriber units on the same line permits servicing a greater number of subscribers with a single transmission line, than is possible with either type of operation alone.

A source 55 of direct current is provided at the central station and connection is made from this source through the exchange 20 and a low pass filter 56 to the transmission line 11. The subscriber unit telephones 57 and 58, which are operated by direct current, are coupled to the transmission line 11 through low pass filters 59 and 60 respectively. A ringing signal generator 61 is connected through switch 62 and low pass filter 66 to the transmission line for signalling subscriber units 57 and 58. In this case the subscribers are differentiated between by virtue of coded signals, utilizing the same ringing generator 61.

Low pass filters 56, 59 and 60 prevent the carrier signals from interfering with the direct current portions of the system. A filter for elements 56, 59 and 60 is illustrated in FIGURE 3 and comprises a T-network having inductive legs 65 and 66, both 32.7 millihenry and a shunt circuit including series connected inductor 67, 22.5 millihenry and capacitor 68, 0.0913 microfarad. Of course other comparable filters may be used.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. In a telephone system: a central station; a plurality of sources of carrier signal of different frequency at said central station; a transmission line connected to said central station for transmitting said carrier signals; a plurality of subscriber units connected to said transmission line at spaced points remote from said central station, there being at least two subscriber units responsive to each of said carrier signals, each of said subscriber units including ringing signal frequency sensitive indicating means with subscriber units responsive to the same carrier signal having ringing signal frequency sensitive indicating means which are responsive to ringing signals of different frequencies; a plurality of ringing signal generators at said central station, each operating at a different frequency; and means for independently connecting said ringing signal generators to modulate one of said carrier signals, the indicating means at a selected subscriber unit being actuated by the selected ringing signal.

2. In a telephone system: a central station; a plurality of sources of carrier signal of different frequency at said central station; a transmission line connected to said central station for transmitting said carrier signals; a plurality of subscriber units connected to said transmission line at spaced points remote from said subscriber central station; a band pass filter in each of said units, each having a center frequency the same as one of said carrier signals, there being at least two subscriber units tuned to each of said carrier signals; ringing signal frequency sensitive indicating means at each of said units, the frequency sensitive indicating means in each of the units tuned to the same carrier frequency being sensitive to ringing signals of different frequencies; means for independently modulating each of said carrier signals; a plurality of ringing signal generators at said central station, each operating at a different frequency; and means for independently connecting said ringing signal generators to said modulating means, the indicating means at a selected subscriber unit being actuated by the selected ringing signal.

3. In a telephone system: a central station; a plurality of sources of carrier signal at said central station; a source of direct current at said central station; a transmission line connected to said central station; a plurality of carrier subscriber units connected to said transmission line at spaced points remote from said central station, there being at least two subscriber units responsive to each of said carrier signals, each of said subscriber units including ringing signal frequency sensitive indicating means the indicating means of subscriber unit on the same carrier frequency being responsive to ringing signal of different frequencies; a plurality of ringing signal generators at said central station each operating at a different frequency; means for independently selectively connecting said ringing signal generators to modulate any one of said carrier signals, the indicating means at a selected subscriber unit being actuated by the selected ringing signal; a plurality of subscriber units connected to said transmission line at spaced points remote from said central station and each including circuitry responsive to said direct current, said units also including indicating means; and a ringing signal generator associated with said source of direct current and connectable therewith to actuate the indicating means at the subscriber stations responsive to direct current.

References Cited in the file of this patent

UNITED STATES PATENTS

| | | |
|---|---|---|
| 2,202,474 | Vroom | May 28, 1940 |
| 2,559,165 | Molnar | July 3, 1951 |
| 2,604,544 | Dillon et al. | July 22, 1952 |
| 2,721,897 | Schneckloth | Oct. 25, 1955 |
| 2,763,726 | Weller | Sept. 18, 1956 |
| 2,857,464 | Singer | Oct. 21, 1958 |